US010723076B2

(12) United States Patent
Chanclon Fernandez et al.

(10) Patent No.: US 10,723,076 B2
(45) Date of Patent: Jul. 28, 2020

(54) BUILD MATERIAL SOURCE CONTAINER

(71) Applicant: Hewlett-Packard Development Company, L.P., Houston, TX (US)

(72) Inventors: Ismael Chanclon Fernandez, Barcelona (ES); Ernesto Alejandro Jones Poppescou, Sant Cugat del Valles (ES); Xavier Alonso Becerro, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/735,937

(22) PCT Filed: May 12, 2016

(86) PCT No.: PCT/EP2016/060661
§ 371 (c)(1),
(2) Date: Dec. 12, 2017

(87) PCT Pub. No.: WO2017/194112
PCT Pub. Date: Nov. 16, 2017

(65) Prior Publication Data
US 2019/0061250 A1    Feb. 28, 2019

(51) Int. Cl.
*B29C 64/255* (2017.01)
*B22F 3/105* (2006.01)
(Continued)

(52) U.S. Cl.
CPC .......... *B29C 64/255* (2017.08); *B22F 3/1055* (2013.01); *B29C 64/20* (2017.08);
(Continued)

(58) Field of Classification Search
CPC ..... B29C 64/255; B29C 64/20; B29C 64/153; B33Y 30/00; B33Y 99/00; B33Y 40/00;
(Continued)

(56) References Cited

U.S. PATENT DOCUMENTS 3,580,983 A    5/1971  Jackson
3,640,276 A  * 2/1972  Dancy, Jr. ........... A61M 5/1486
                                                128/DIG. 13
(Continued)

FOREIGN PATENT DOCUMENTS

EP      2024168      8/2012
JP      54092493 A   7/1979
(Continued)

OTHER PUBLICATIONS

Hartwig, K.H. et al., "No-Static Plastics", Mar. 1, 2001, pp. 5. http://machinedesign.com/archive/no-static-plastics.
(Continued)

*Primary Examiner* — Donnell A Long
(74) *Attorney, Agent, or Firm* — HGF Limited

(57) ABSTRACT

There is provided a build material source container for use in a material management station of a three dimensional, 3D, printer. The source container defines a substantially enclosed space for holding build material and has an aperture for build material ingress and egress. At least part of the build material source container is formed from an electrically conductive material. The conductive material portion of the build material source container is connectable to Earth to discharge static electricity generated within the build material source container.

13 Claims, 7 Drawing Sheets

(51) Int. Cl.
    *B33Y 40/00*         (2020.01)
    *B33Y 99/00*         (2015.01)
    *B29C 64/20*         (2017.01)
    *B33Y 30/00*         (2015.01)
    *B29C 64/153*        (2017.01)

(52) U.S. Cl.
    CPC ............ *B33Y 30/00* (2014.12); *B33Y 40/00* (2014.12); *B33Y 99/00* (2014.12); *B22F 2003/1056* (2013.01); *B29C 64/153* (2017.08); *Y02P 10/295* (2015.11)

(58) Field of Classification Search
    CPC ............ B22F 3/1055; B22F 2003/1056; Y02P 10/295
    USPC .................................. 222/105, 464.1, 464.7
    See application file for complete search history.

(56) References Cited

U.S. PATENT DOCUMENTS

| | | | |
|---|---|---|---|
| 5,759,649 | A | 6/1998 | Dinter et al. |
| 5,853,202 | A | 12/1998 | Li et al. |
| 5,931,510 | A | 8/1999 | Mathew et al. |
| 6,283,320 | B1 | 9/2001 | Patch |
| 9,533,870 | B2 * | 1/2017 | Zapp ............... B67D 3/0006 |
| 2005/0082076 | A1 * | 4/2005 | Przytulla ............... B65D 1/12 |
| | | | 174/50 |
| 2007/0257224 | A1 * | 11/2007 | Butruille ............... B67D 3/047 |
| | | | 251/304 |
| 2008/0006334 | A1 | 1/2008 | Davidson et al. |
| 2009/0001078 | A1 * | 1/2009 | Cassina ............... B65D 25/42 |
| | | | 220/88.1 |
| 2012/0279867 | A1 | 11/2012 | Lange et al. |
| 2013/0164960 | A1 | 6/2013 | Swanson et al. |
| 2014/0270594 | A1 | 9/2014 | Holdstock et al. |
| 2014/0353338 | A1 * | 12/2014 | Huber ............... A01M 7/0032 |
| | | | 222/318 |

FOREIGN PATENT DOCUMENTS

| | | |
|---|---|---|
| JP | 62013897 A | 1/1987 |
| JP | 2005503939 A | 2/2005 |
| JP | 2007241058 A | 9/2007 |
| JP | 2007528826 A | 10/2007 |
| JP | 2008254816 A | 10/2008 |
| WO | WO-2009000360 | 12/2008 |

OTHER PUBLICATIONS

International Search Report and Written Opinion dated Jan. 19, 2017, PCT Patent Application No. PCT/EP2016/060661, filed May 12, 2016, European Patent Office.

* cited by examiner

BUILD MATERIAL SOURCE CONTAINER

CLAIM FOR PRIORITY

The present application is a national stage filing under 35 U.S.C. § 371 of PCT application number PCT/EP2016/060661, having an international filing date of May 12, 2016, the disclosure of which is hereby incorporated by reference in its entirety.

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may include applying ultraviolet light to photopolymer resin, melting semi-crystalline thermoplastic materials in powder form, and electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

3D printing systems utilise build materials (also known as additive manufacturing build materials), often containing powder materials, i.e. materials formed by powder particles, which are fused together during the printing process. Build materials may also contain paste material, slurry material or liquid material. These powder materials may be transported both during the printing process and after the printing process such as when excess powder material is removed from around a printed component or part. The excess powder may be recycled for use in a future printing process.

The build material is usually provided in a source container from where it needs to be transferred to the building area or building compartment of the additive manufacturing apparatus where the actual manufacturing takes place. Movement of such materials may be performed through aspiration techniques. However, the movement of particulate build matter within such aspiration systems may generate static electricity due to the friction of high-velocity particles. It is desirable to reduce the build-up of static electricity within the build material containers of such systems.

U.S. Pat. No. 6,283,320 B1 (Patch Roger [US]) describes a container for volatile liquids, such a gasoline, made of a conductive plastic material. US 2014/0270594 A1 (Holdstock, Paul [GB] et al) describes a system for decreasing electrostatic discharges to reduce the potential for incendiary discharges caused by electrostatic charges in flexible containers. U.S. Pat. No. 5,759,649 A (Dinter Peter [DE] et al) describes a plastic packaging container with improved ability for electrostatic charge derivation.

DETAILED DESCRIPTION

Three-dimensional objects can be generated using additive manufacturing techniques. The objects may be generated by solidifying portions of successive layers of build material. The build material can be powder-based and the properties of generated objects may be dependent on the type of build material and the type of solidification. In some examples, solidification of powdered build material is enabled using a liquid fusing agent. In further examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of reducing static electricity build up within build material containers of an example three dimensional (3D) printing system.

Figure 1A:
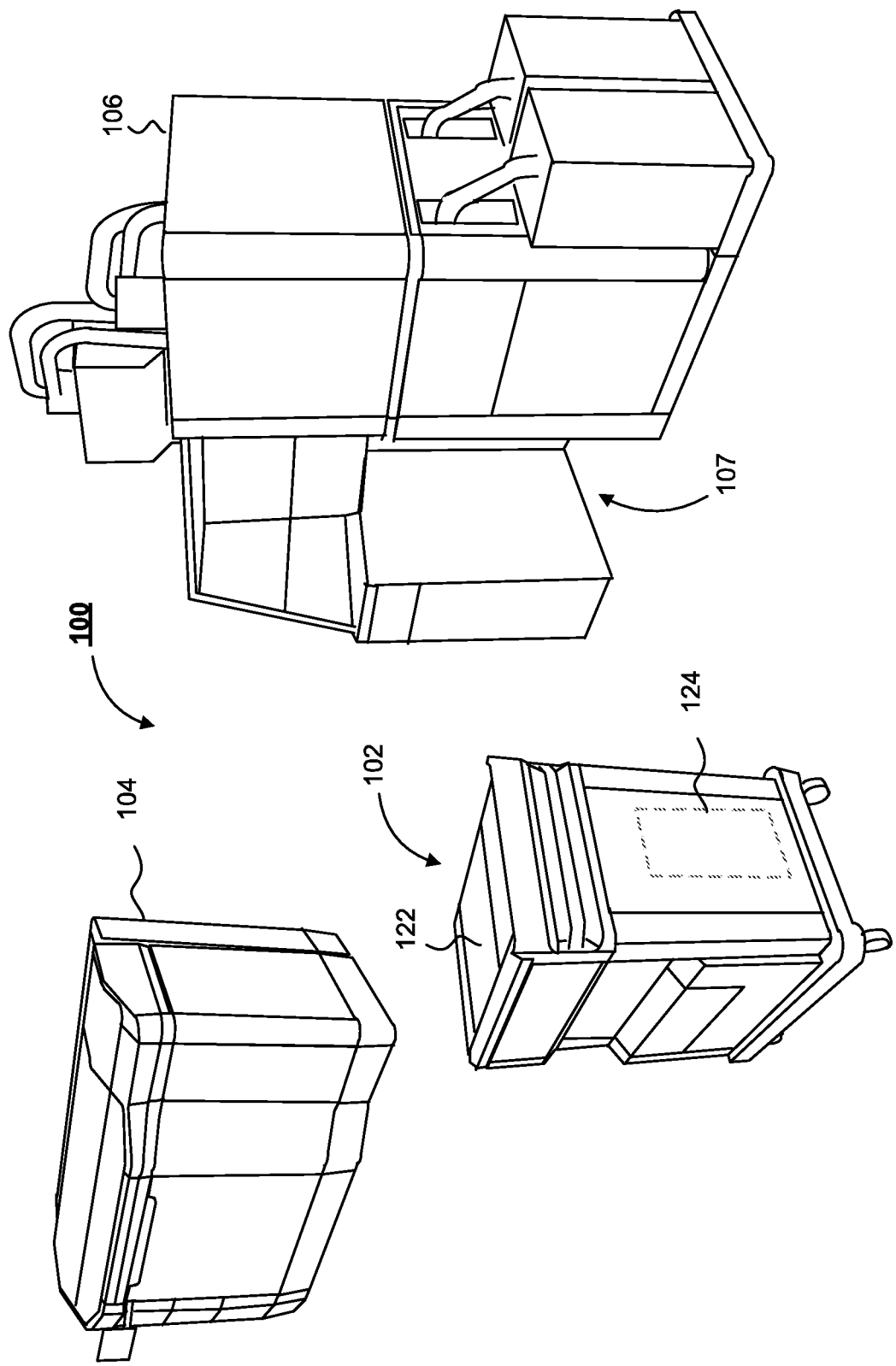
FIG. 1A schematically illustrates an example of a three dimensional (3D) printing system.
Figure 1B:
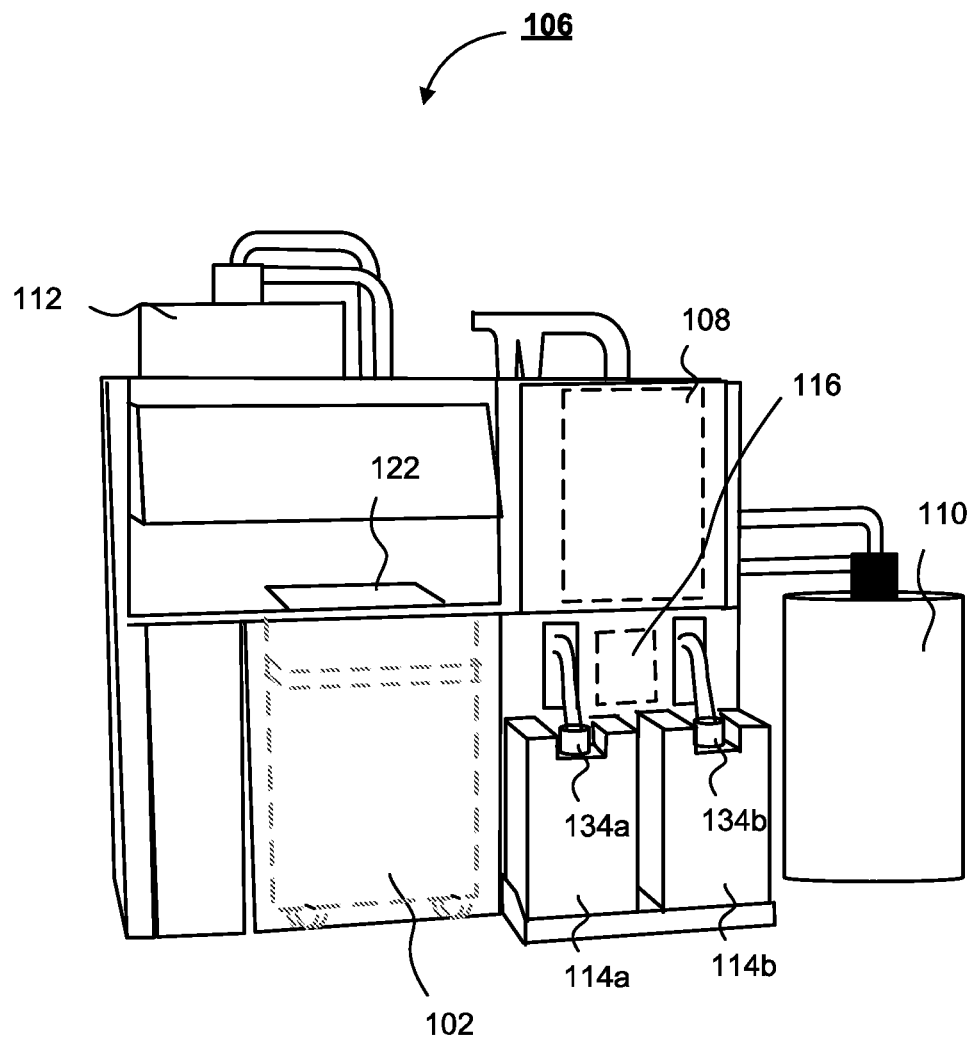
FIG. 1B schematically illustrates the material management station of the example of FIG. 1A.

FIGS. 1A and 1B illustrate an example 3D printing system. As shown in FIG. 1A, the 3D printing system 100 (or additive manufacturing system) according to one example comprises a plurality of additive manufacturing apparatuses, for example: a trolley 102, a 3D printer 104 and a material management station, MMS, 106. The MMS 106 manages build material. The printing system 100 may use a solidification device to selectively fuse powder material to form a 3D printed article. Types of solidification device may include lasers (referred to as selective laser sintering, SLS) or the deposition of fusing agents. The powder material is a build material and different types of build material may be used.

The trolley 102 is arranged to slot into a docking position in the printer 104 to allow the printer 104 to generate a 3D object within the trolley. The trolley is also arranged to also slot (at a different time) into a docking position 107 in the material management station 106. The trolley 102 may be docked in the material management station 106, prior to a 3D printing process, to load the trolley with build material in preparation for a subsequent 3D printing process.

The build material loaded into the trolley may include recycled or recovered build material from one or more previous printing processes, fresh build material or a portion of fresh and recycled build material. Some build materials may be non-recyclable and hence in this case no recovered build material will be used to load the trolley. The build material may be or may include, for example, powdered metal materials, powdered composited materials, powder ceramic materials, powdered glass materials, powdered resin material, powdered polymer materials and the like. In some examples where the build material is a powder-based build material, the term powder-based materials is intended to encompass both dry and wet powder-based materials, particulate materials and granular materials. It should be understood that the examples described herein are not limited to powder-based materials, and may be used, with suitable modification if appropriate, with other suitable build materials. In other examples, the build material may be in the form of pellets, or any other suitable form of build material, for instance.

FIG. 1B schematically illustrates the material management station, MMS, 106 of the example of FIG. 1A, with the trolley 102 of FIG. 1A docked therein.

As shown in the example of FIG. 1B, the material management station 106 has two interfaces for receiving two fresh build material source containers (or cartridges) 114a, 114b, which may be inserted into and released from the MMS 106. Such fresh build material source containers may alternatively be termed supply or source cartridges, or build material supply tanks. In one example, the build material may be a powdered semi-crystalline thermoplastic material. In one example, the source containers 114a, 114b are replaceable source containers that are to be connected to an additive manufacturing system in an at least partially filled condition so as to collect build material from the containers 114a, 114b, and to be removed after exhaustion so as to be replaced by a second, similar container filled with build material.

The source containers 114a, 114b are illustrated in an upright orientation. In one example the build material is powder, for example of a type and/or particle size as described above. The containers 114a, 114b include a reservoir (also referred to as an enclosure) for holding the build material. The build material is contained by walls of the reservoir. The containers 114a, 114b further include an outlet structure including an opening, or aperture, to allow build material to pass out of the reservoir, or where needed, into the reservoir.

In this example, each fresh build material source container 114a, 114b has a capacity of between thirty and fifty litres. The provision of two fresh build material source containers 114a, 114b allows "hot swapping" to be performed such that if a currently active container becomes empty or close to empty of build material when the trolley 102 is being filled with build material by the MMS 106 in preparation for an additive manufacturing process, a fresh build material supply source can be dynamically changed to the other of the two containers. The MMS 106 may have one or more weight measurement device(s) to assess how much fresh build material is present at a given time in one or more of the fresh build material source containers 114a, 114b. The fresh build material from the containers 114a, 114b, may be consumed, for example, when loading the trolley 102 with build material prior to the trolley 102 being installed in the printer 104 for a 3D printing production run.

In one example the build material within the supply container is powder that has an average volume-based cross sectional particle diameter size of between approximately 5 and approximately 400 microns, between approximately 10 and approximately 200 microns approximately, between approximately 15 and approximately 120 microns or between approximately 20 and approximately 70 microns. Other examples of suitable, average volume-based particle diameter ranges include approximately 5 to approximately 70, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 80 microns using build material containers that contain powder having average volume-based particle diameters of between approximately 40 and approximately 60 micron. For example the additive manufacturing apparatus can be reset to distribute different layer thicknesses.

Suitable powder-based build materials for example containers of this disclosure include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, coloured powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminium and polyamide, multi-colour powder, and plastics/ceramics blends.

Build material is moved around within the MMS 106 in this example using a vacuum system, which promotes cleanliness within the system and allows for recycling of a portion of build material between successive 3D printing jobs, where the type of build material selected for use is recyclable. References to a vacuum system in this specification include a vacuum that is partial vacuum or a pressure that is reduced, for example, relative to atmospheric pressure. The vacuum may correspond to "negative pressure", which can be used to denote pressures below atmospheric pressure in a circuit surrounded by atmospheric pressure.

A total trolley use turn-around time for printing of a 3D object before the trolley 102 can be reused may depend upon both the printing time of the printer 104 when the trolley is in the printer 104 and a cooling time of the contents of the build volume of the trolley 104. The vacuum system can be used, in some examples, to promote more rapid cooling of the contents of the build volume following a 3D print production process than would otherwise occur without the vacuum system. Alternatives to the vacuum system such as a compressed air system can create excess dust, potentially making the clean-up process more difficult.

The MMS 106 in this example has a recovered build material tank 108 (see FIG. 1B), located internally, where build material recovered from the printing process by the vacuum system is stored for subsequent reuse, if appropriate. Some build materials may be recyclable whilst others may be non-recyclable. In an initial 3D printing production cycle, typically 100% fresh build material will be used. However, on second and subsequent printing cycles, depending upon build material characteristics and user choice, the build material used for the print job may comprise a proportion of fresh build material (e.g. 20%) and a portion of recycled build material (e.g. 80%). Some users may elect to use mainly or exclusively fresh build material on second and subsequent printing cycles, for example, considering safeguarding a quality of the printed object. The internal recovered build material tank, or container, 108 may become full during a post-production clean-up process, although it may become full after two or more post-production clean up processes have been performed, but not before. Accordingly, an overflow tank in the form of an external overflow tank 110 can be provided as part of the MMS 106 to provide additional capacity for recovered build material for use once the internal recovered build material tank 108 is full or close to full capacity. Alternatively, the external overflow tank 110 can be a removable tank. In this example, one or more ports are provided as part of the MMS 106 to allow for output of or reception of build material to and/or from the external overflow tank 110. A sieve 116 or alternative build material refinement device may be provided for use together with the internal recovered build material tank 108 to make unfused build material recovered from a 3D printing production process for recycling more granular, that is, to reduce agglomeration (clumping).

The MMS 106 in this example has a mixing tank 112 (or blending tank) comprising a mixing blade (not shown) for mixing recycled build material from the internal recovered build material tank 108 with fresh build material from one of the fresh build material source containers 114a, 114b for supply to the trolley 102 when it is loaded prior to a printing production process. The mixing of the two materials is performed in a mixing tank 112, which in this example, is provided on top of the MM6 106, above the location of the build platform 122 when the trolley 102 is docked therein.

The fresh build material source containers 114a, 114b, the external overflow tank 110 and the main body of the MMS 106 may be constructed to fit together in a modular way, permitting a number of alternative geometrical configurations for the fully assembled MMS 106. In this way, the MMS 106 is adaptable to fit into different housing spaces in a manufacturing environment.

The fresh build material source containers 114a, 114b may be connected to the main body of the MMS 106 via respective source tank connection units 134a, 134b such that the containers are releasable. These source container connection units 134a, 134b may incorporate a security system to reduce the likelihood of unsuitable build material being used in the 3D printing system. In one example, suitable fresh build material source containers 114a, 114b are provided with a secure memory chip, which can be read by a chip reader (not shown) or other processing circuitry on the main body of the MMS 106 to verify the authenticity of any replacement supply tank (cartridge) 114a, 114b that has been installed. In this example, the chip reader may be provided on the source container connection units 134a, 134b and upon attachment of the fresh build material source containers 114a, 114b to the respective connection unit 134a, 134b, an electrical connection may be formed. The processing circuitry in the MMS 106 may also be used to write a measured weight of build material determined to be in the respective fresh build material source container(s) 114a, 114b onto the secure memory chip of the container to store and/or update that value. Thus, the amount of authorised build material remaining in the fresh build material supply container(s) 114a, 114b at the end of a trolley loading process can be recorded. This allows the withdrawal of particulate build material from the fresh build material source containers 114a, 114b beyond the quantity with which it was filled by the manufacturer to be prevented. For example, in the case of a fresh build material source container 114a, 114b from which the tank manufacturer's authorised fresh build material has previously been completely withdrawn, this prevents the withdrawal of further build material that may damage the printer or print quality, if the fresh build material source container 114a, 114b were re-filled with an alternative fresh build material.

The secure memory chip of the fresh build material source containers 114a, 114b can store a material type of the build material contained within the fresh build material source containers. In one example, the material type is the material (e.g. ceramic, glass, resin, etc.). In this way, the material management station 106 can determine the material type to be used by the MMS 106.

Referring to FIG. 1A, printed parts along with unfused build material, for example powder-based materials, can be transported from the 3D printer 104 to the material management station 106 via the trolley 102. The MMS 106 can then be used to process build material such as the powder-based materials and printed parts from the trolley 102.

Figure 2B:
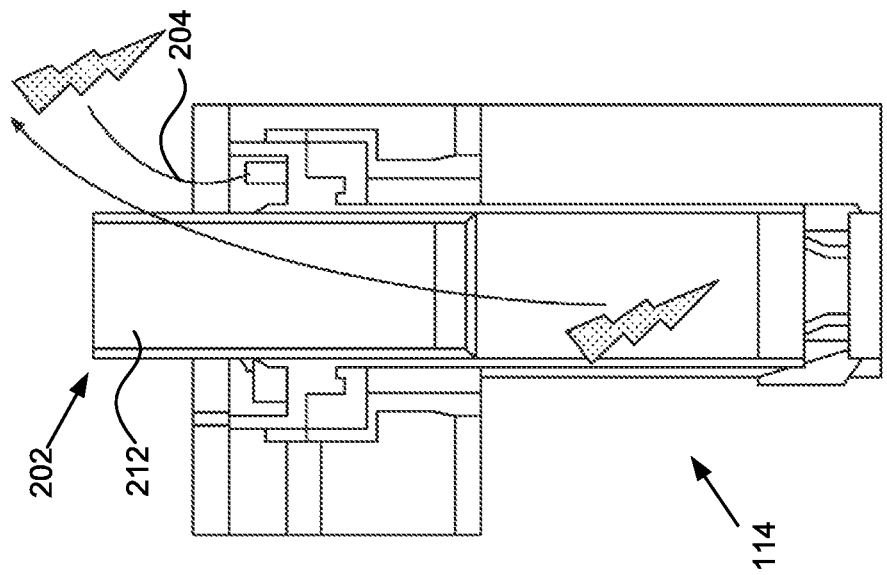
FIGS. 2A and 2B show partial cross sections through portions of one example of a build material source container which may be coupled to a material management station.
Figure 2A:
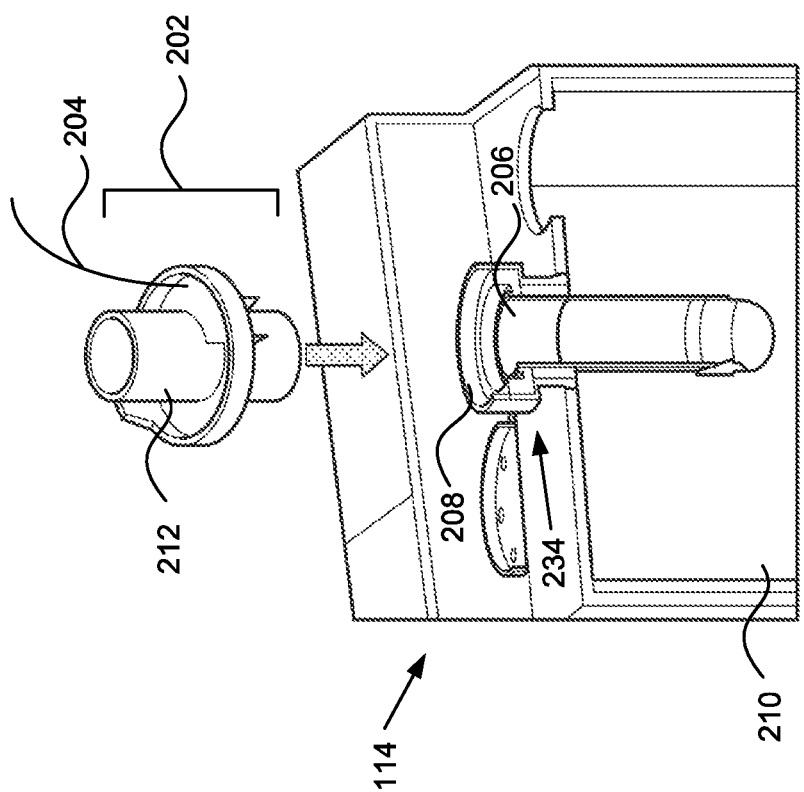

FIGS. 2A and 2B illustrate partial cross sectional views of portions of a fresh build material source container 114, such as the containers 114a, 114b as illustrated in FIG. 1B. FIGS. 2A and 2B show one example of a fresh build material source container 114a, 114b, connectable to a material management station, MMS, within which it may be desirable to reduce static build up. Although the following paragraphs describe in detail a specific structure of a fresh build material source container 114a, 114b; in further examples, the following structure may additionally, or alternatively, be comprised within areas of potential static build up within further containers of build material within the MMS 106, for example, the recovered material tank 108.

Referring to FIGS. 2A and 2B, each of the fresh build material source containers 114a, 114b comprise a substantially enclosed space for holding build material, and an aperture 206 for enabling material ingress and egress. Each source container 114, is connected to the main body of the MMS 106 by a respective outlet structure 234, which may receive a respective connection unit, 202, such as the connection units 134a, 134b as detailed in FIG. 1B.

In some examples the outlet structure 234 is formed from a conductive moulded plastic, which in some examples may be carbon black; however, any such suitable moulding materials may be used. In additional examples, the portion of the outlet structure 234 in connection with, or facing, the powder flow may be formed from such materials. The outlet structure 234 may be inserted and/or removed from the source container 114 by means of a screw motion, or one of many alternative fixture arrangements. Such arrangements allow the user to conveniently remove the outlet structure 234, for example, should they wish to dispose of the source container 114.

The outlet structure 234 is at least partially enclosed within the aperture 206 at a top side of a reservoir 210 of the source container 114. As shown in FIG. 2A, the outlet structure 234 is to receive a connection unit 202 to connect the material source container 114 to the MMS 106. In some examples, the connection unit 202 comprises a tube body 212 which defines an interior channel for allowing build material, such as powder, to flow between the MMS 106 and the source container 114. In additional examples, a vent may be provided on the top side of the reservoir 210 of the source container 114, which may reduce pressure in the source container 114.

In some examples, the outlet structure 234 may further comprise an internal longitudinal collection unit that extends from an outlet opening at the top of the reservoir 210 to near an inner bottom of the reservoir 210 so as to collect build material from the bottom of the source container 114. The internal collection unit guides the build material to an outlet opening at the outlet structure 234, wherein the build material may be sucked into a tube body 212 of the connection unit 202 by means of vacuum force. The outlet structure 234 may include a retaining structure, to maintain a connection to the connection unit 202 as will be described for a particular example in connection with later Figures. The outlet structure 234 may comprise an adapter 208 to additionally guide the connection unit 202 to connect with the outlet structure 234. The adapter 208 ensures that the outlet structure 234 conforms to the shape of a lower side of the connection unit 202.

The connection unit 202 may comprise a tube body 212 which defines an interior channel for allowing a build material, such as powder, to flow between a first and second end of the tube 212. For example, the build material may be transported through the interior channel by means of air pressure, where a vacuum is formed (for instance using a pump) to draw the powder through the tube 212, providing an aspiration system.

Figure 3:
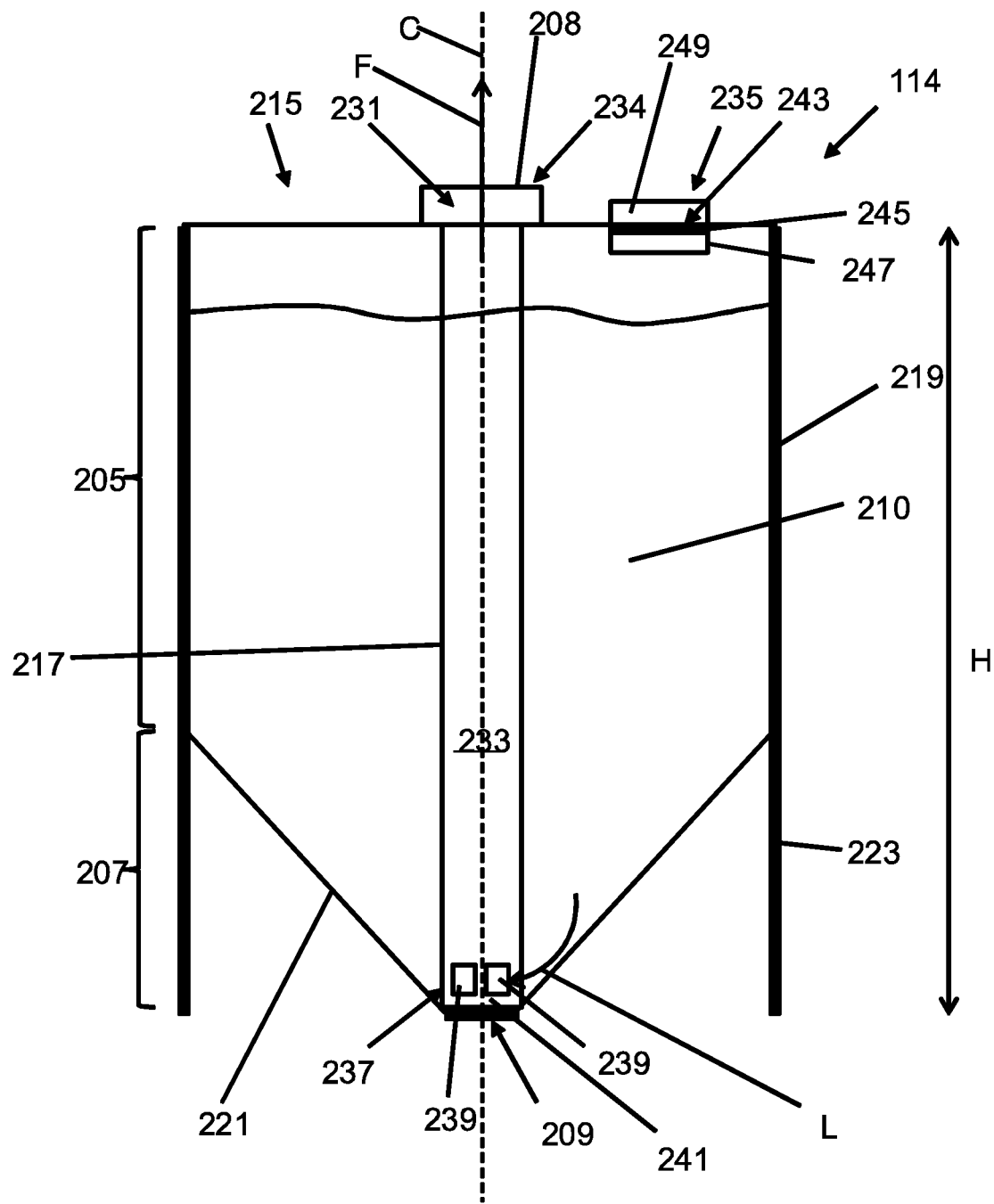
FIG. 3 illustrates a cross section of an example build material source container.

FIG. 3 illustrates another detailed example of a build material source container, such as build material source container 114, including a build material reservoir 210. The reservoir 210 may be at least partly flexible, and in some examples, may be a flexible bag. The container 214 can be provided with a reinforcement structure 223, for example, around the reservoir 210. At least part of the reservoir 210 may be attached, or adhered, to the reinforcement structure 223. The reinforcement structure 223 may comprise a box, for instance formed from cardboard. The flexible bag may be arranged to fit within and be supported by the box. The build material source container may comprise a disposable or replaceable component. The outlet structure, which may be formed from a conductive moulded plastic, may be coupled to the box and/or the bag. The box may be collapsible, for instance if the outlet structure is removed.

The reservoir 210 may include an upper section of at least one relatively upright wall, and a lower section of funnelled shape. At least one side wall of the upper upright section may extend substantially vertically in an upright, unfolded and filled condition of the containers 114a, 114b. In different examples, the at least one substantially vertical side wall may be at least one rounded wall or may form a rectangle with straight or rounded corners, as seen from a top view (not shown). In this example we will discuss the rectangular version having four side walls, to facilitate storing higher volumes of build material.

The source container 114 comprises an upper portion 205 and a lower portion 207, wherein the upper portion 205 includes non-converging, for example substantially upright, walls 219 and covers most of the height H of the container 114. The container 114 includes an outlet structure 234 having an outlet opening 231 at the top side to allow the build material to exit the reservoir 210 from the top side 215. The outlet structure 234 may include an adapter 208 to connect to an external connection unit, which may be a pressure unit, such as a vacuum source or pump, to facilitate retrieving build material from the reservoir 210 by vacuum suction.

In the illustrated example, the lower portion 207 is funnelled to guide build material towards a centre collection area at a bottom 209 of the reservoir 210 under influence of gravity and/or pressure generated by the pressure unit. The funnel is formed by inclined, converging walls 221.

The outlet structure 234 of the container 114 includes an internal longitudinal collection unit 217 that extends from the outlet opening 231 near the top 215 of the reservoir 210 to the bottom 209 to collect build material from the bottom 209 of the reservoir 210. The collection unit 217 can form a fixed or detachable part of the outlet structure 234. The collection unit 217 is to collect the build material from the collect area at the bottom 209, and to guide the build material out through the outlet opening 231 at the top 215. In one example, the collection unit 217 is at least partly tube-shaped. The tube-shaped unit may extend from the outlet opening 231 at the top 215 to the centre bottom 209 of the reservoir 210. The collection unit 217 extends along the non-converging, e.g. upright, upper portion 205, and into the funnel 207 to collect build material from the bottom 209 of the funnel 207. The collection unit 217 can, in some examples, include a rigid tube or a flexible hose.

In one example, the collection unit 217 is to facilitate vacuum suction through its tube. In such example, the adapter portion 208 of the outlet structure 234 is arranged to connect to a pressure unit of an additive manufacturing apparatus so that, when the pressure unit is connected to the outlet structure 234, and switched on, a build material (and air) flow is established through the tube in an upwards direction F.

In an example, the container 114 includes a throughput structure 235 in the top wall 215 next to the outlet structure 234 to facilitate venting air into the reservoir 210 during vacuum suction. In another example, the reservoir 210 is at least partly flexible whereby during said vacuum suction certain wall portions may flex inwards and/or vibrate. In a further example the pressure unit may apply a positive pressure to the reservoir 210, for example when filling the reservoir 210. In certain examples the flexible walls may conveniently bend and/or vibrate under such positive pressure, facilitating proper filling and mixing of the build material.

In one example the reservoir 210 has an inner volume of between approximately 5 and 60 litres, for example between approximately 15 and 45 litres, and the tube can have a length, between the outlet opening 231 and a distal end 241, of approximately 40 to 65 centimetres. The tube can have a diameter between approximately 10 and 70 millimetres, for example between approximately 25 and 60 millimetres.

Build material is to enter the tube in a distal end portion 237 of the tube. The end portion 237 extends near the bottom 209 to extract the build material from the bottom 209. In a further example the end portion 237 touches the bottom 209 whereby the tube may provide additional structural reinforcement to the container 214, for example in addition to the reinforcement structure 223. The end portion 237 includes at least one suction opening 239 through which the build material is to enter. In one example, the end portion 237 includes threads or surfaces between which multiple of such suction openings 239 extend. In an example the end portion 237 may include a filter to restrict undesired particles from being provided to the collection system.

In one example the end portion 237 of the tube includes lateral suction openings 239 whereby in operation the build material enters the tube 233 in an at least partly lateral direction L. The end portion 237 may further include a distal end structure 241 such as a cap or thread. In an example the distal end structure 241 engages the reservoir bottom 209. The lateral openings 239 extend at least partially above the distal end structure 241 so that in operation build material enters into the tube 233 laterally, above the distal end structure 241. The distal end structure 241 may prevent that the bottom wall portions block the suction openings 239.

During movement of particulate matter of the build material within the build material source containers, static electricity may be generated due to the continuous frictional forces between the particulate matter. Frictional forces may also occur between the particulate matter and the structure of the build material source container. Such considerations may also apply to movement of particulate matter elsewhere in the MMS 106. While specific disclosure is made relating to a build material source container 114, the same disclosed approach of forming portions of the container out of an electrically conductive material may be applied to substantially any portion of the MMS 106. In particular, any portion of the MMS 106 where powder moves at high speed and static electricity generation due to friction is likely could be so formed from a conductive material. Such portion may also be any powder flow guiding component, such as, for example, the outlet structure 234 or within connection unit 202. Such portions of the MMS 106, or guiding components, formed from an electrically conductive material may be connectable to Earth to provide an electrical discharge path.

In one example, the conductive material that is to ground the container along the powder flow components is part of, or extends along, the tube 233. In some examples, this is from near the inlet openings up to the aperture 206. Suitable conductive material includes a plastic compound with conductive particles, a metal or metal alloy, a coating, a film, wiring, coils, etc. The build material container with conductive material can be designed to be readily replaceable.

Figure 4:
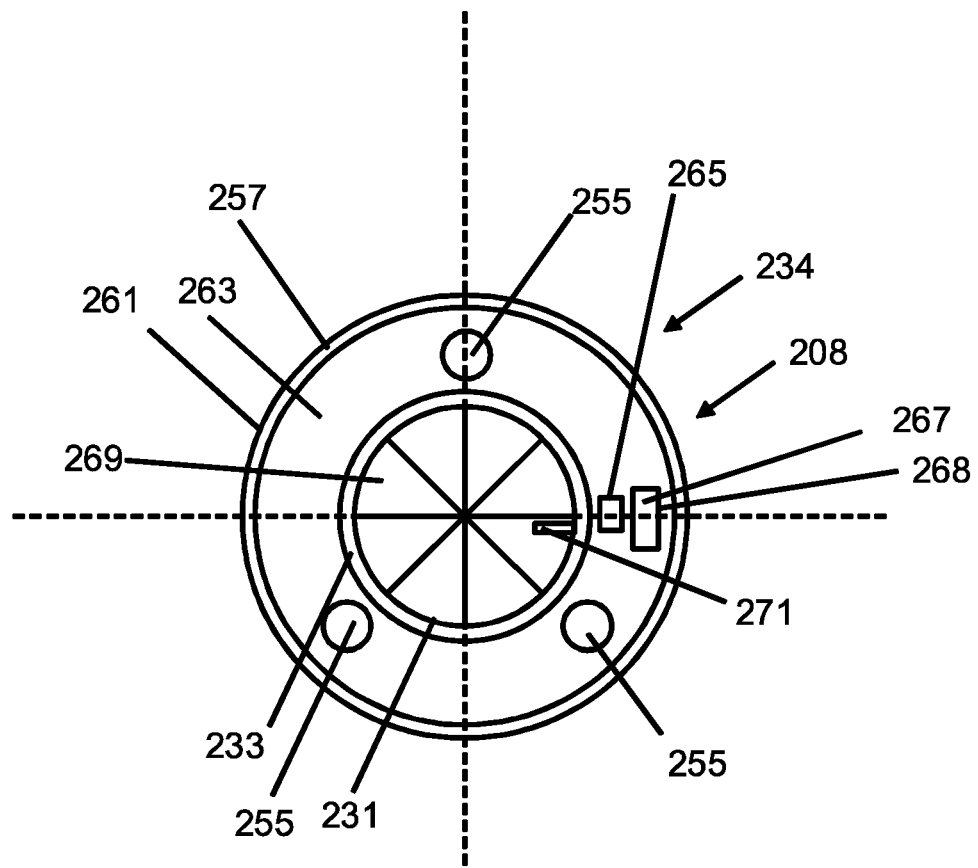
FIG. 4 illustrates a diagrammatic top view of an example of a build material source container.
Figure 5:
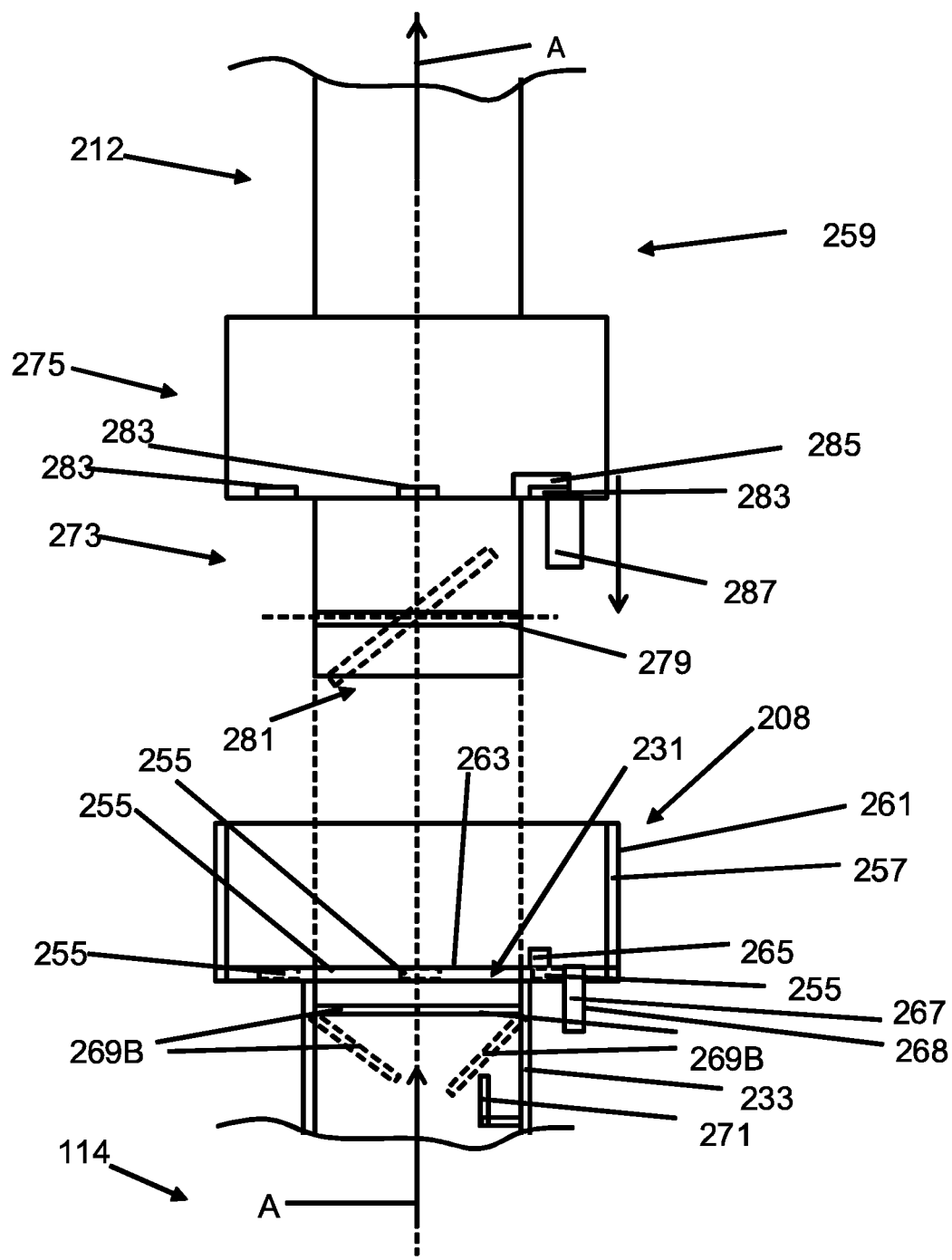
FIG. 5 illustrates a diagrammatic front view of an outlet structure of an example build material source container, and a connection unit.

FIGS. 4 and 5 illustrate diagrams of adapter portions of an example outlet structure 234 of an example build material container and onward connection via an associated connection unit 202, such as a pressure unit 259, to the MMS 106. FIG. 4 illustrates a diagrammatic top view of an example outlet structure 234. FIG. 5 illustrates a diagrammatic partly cross-sectional side view of an end portion of an external pressure unit 259 to be associated with the example outlet structure 234.

In examples, the outlet structure 234 of the source container 114 comprises an adapter 208 to connect to the connection unit 202. The outlet structure 234 comprises an outlet opening 231 in its centre to provide access to an inside of a reservoir, for example via an outlet tube 233, as illustrated in FIG. 3, that protrudes from a bottom of the adapter 208 into the reservoir up to a reservoir bottom 209.

In the illustrated example, the adapter 208 is wider than the tube 233. The adapter 208 includes at least one upright wall 257 along an outer edge 261 of an interface face 263 of the adapter 208. The upright wall 257 may be a circumferential wall. The upright wall 257 may serve to guide the corresponding pressure unit 259 into interconnection.

The tube 233 can function as a first guide feature because it may guide a pressure snout 273 into the outlet structure 234. The upright wall 257 may function as a second guide feature because it may guide the pressure unit adapter 275 into the outlet structure 234.

The upright wall 257 may protrude in an air/build material flow direction A. The upright wall 257 may fit to the corresponding pressure unit 259, for example to provide for some level of friction fit with an adapter 275 of the pressure unit 259. The outlet structure adapter 208 further includes an interface face 263. The interface face 263 may be annular, and extend around the outlet opening 231, between the outlet opening 231 and the upright wall 257, perpendicular to the air/build material flow direction A. Several interface elements can be provided in the interface face 263. In one example, certain further guide features may be provided in the interface face 263 to assist in guiding and coupling the pressure unit to the outlet structure 234, such as a digital interconnect pocket 268, which may serve as a third guide feature.

The outlet adapter 208 may include at least one interconnect feature 255 in the interface face 263. The interconnect feature may be magnetic. The magnetic interconnect feature 255 includes at least one magnetic element, such as a magnetic metal or magnet, to attract to a corresponding magnetic element in the adaptor 275 of the external connection unit 202. The interconnect feature 255 can be exposed in, and/or protrude from, the annular interface face 263. The magnetic interconnect 255 on the interface face 263 attracts the connection unit adapter 275 once its respective magnetic elements 283 are close to the magnetic interconnects 255 of the outlet adaptor 208, so that a final interconnection movement is done automatically. The magnetic guide feature 255 may attract the snout 273 into a final interconnected state whereby the attraction force of the magnetic guide features 255 may provide feedback to an operator that the outlet structure 234 and snout 273 are properly connected. The magnetic attraction may also aid in retaining the interconnected snout 273 and outlet structure 234. The interconnection between the snout 273 and adapter 208 may be further maintained by the vacuum suction force when the connection unit 202, as a pressure unit, is switched on.

Other guide features of the outlet structure 234 can include protrusions, rails, notches, etc., for example male or female elements of interconnecting structures. Furthermore, retain features such click fingers, latches, notches, friction fit elements, etc. can be provided, to latch to the pressure unit so that the adapter and pressure unit remain coupled, for example by hooking, latching, friction, etc. also when the pressure unit is not turned on. That said, the interconnect features 255 may facilitate a robust and user friendly interconnection, which, e.g., may work well in a dusty environment.

The outlet adapter 208 can further include a sensor activator 265. In an example the activator 265 protrudes from the interface face 263, to activate a sensor device of the connection unit 202, for example optically or mechanically. The adapter 208 further includes a data interface 267. The data interface can be provided in the interface face 263, for example in a pocket 268 of the interface face 263. The data interface 267 itself may be formed by contact pads of a memory chip, microcontroller, integrated circuit, smart chip, etc. The data interface 267 is to connect to a corresponding data interface 287 that is provided on the adaptor 275 of the connection unit 202. The data interface may be electrically insulated from electrically conductive portions of the build material source container. For instance, the interface face 263 may be formed upon an insulating plastic portion of the adapter.

The outlet structure 234 may further include a valve 269 to cover the outlet opening 231. The valve 269 may extend inside the tube 233. The valve 269 is to inhibit that build material, for example powder dust, exits the reservoir when the pressure unit 259 is not connected. In one example the valve 269 is to open by at least one of (i) enough pressure onto the outlet structure 234 by the connection unit 202, and (ii) an external adapter tube or the like that is inserted in the outlet structure 234 and thereby pushes the valve 269 to open. In the illustrated example the valve 269 is a flexible film valve, for example of four flexible films that each form a quarter of a circle and that protrude from the inner wall of the tube 233. The film valves 269B open by insertion of the snout 273 and flex back into closing position when the snout 273 is withdrawn from the outlet structure 234.

The outlet adapter 208 may further include a protruding finger 271 that protrudes from an inner wall of the tube 233, in a direction upwards. In the illustrated example the finger 271 protrudes, first, away from the inner wall, and then points upwards towards the outlet opening 231 in order to push-open a corresponding valve in the connection unit 202.

The snout 273 can be tube-shaped, with an outer wall diameter that corresponds to an inner diameter of the outlet tube 233 of the container 114 to facilitate that the snout 273 slides into the tube 233 in an insertion direction I, opposite to the vacuum suction direction A. The snout 273 is shorter than the tube 233, for insertion partway into an upper portion of the tube 233. The snout 273 may fit in the tube 233 to suck in build material from the reservoir 203 while inhibiting that build material settles between the outer wall of the snout 273 and the inner wall of the tube 233. In an example a friction fit may be established between the snout 273 and the tube 233.

A valve 279 can be provided in the snout 273 to close the snout 273, for example when the pressure unit (connection unit) 202 is turned off. The closed valve 279 may inhibit that build material exits the snout 273 when the vacuum is turned off. In the illustrated example the snout valve 279 is a round swivel valve, the outer diameter of which matches an inner diameter of the snout. The valve 279 can be positioned near the inlet opening 281 at the distal end of the snout 273. The finger 271 in the outlet tube 233 engages the valve 279 at insertion of the snout 279 in the tube 233, thereby push-opening the valve 279 so that build material can freely flow into the snout 279. At the same time the other valve 269, 269B, in the outlet tube 233, is opened by the snout 273.

As previously detailed, the adapter 275 of the pressure unit 259 may include at least one interconnect feature 283, which may be magnetic, to attract associated magnetic interconnect features 255 of the outlet adapter 208, to facilitate proper interconnection between the snout 273 and the outlet structure 234. As mentioned, when the pressure unit 259 is switched on, the vacuum itself may retain the snout 273 and outlet structure 234 in an interconnected state. The adapter 275 may include a sensor circuit 285 that senses the protrusion 265 of the outlet adapter 208. The sensor circuit 285 may signal a controller or servo of the pressure unit 259 or additive manufacturing apparatus that proper interconnection has been established, for example to switch on the pressure unit 259 and/or to open a further internal valve unit internal to the pressure unit 259. Thereby the pressure unit 259 is switched on during a proper mechanical and electrical interconnection with the build material container 114. The pressure unit adapter 275 can further include a host data interface 287 that is to interconnect with the container data interface 267 of the outlet adapter 208. In one example the data interface 287 may provide transfer data as received from the container data interface 267 including authentication data and build material data to a controller of the pressure unit 259 or additive manufacturing apparatus. The controller may authenticate the container based on the read data. In one example the pressure unit 259 is switched on if authentication is established. In a further example both the sensor engaging protrusion 265 and the digital interface 267, including authentication data, need to be properly interconnected to switch on the pressure unit 259.

In another example, the magnetic interconnect features 255 are fixing elements such as screws to locate or fix the adapter 208 to the rest of the source container, or outlet structure 234. In an example, the fixing elements 255 are not to be connected to magnetic elements of the pressure unit 259. In different examples, the screws 255 may serve as at least one of (i) fixing elements, (ii) magnetic guide features, and (iii) ground connection, or more. Where the fixing and/or magnetic elements 255 are to discharge through a ground, the snout 273 of the pressure unit 259 may have corresponding conductive and/or magnetic interconnect features 283 that are connected to a ground, for example, to discharge the outlet structure 234 of the container during build material (e.g. powder) flow.

The build material collection tube 233 may include an end portion 237 at its distal end with at least one build material vacuum suction opening 239. In operation, the tube 233 may extend within a build material reservoir to collect build material from a bottom of the reservoir. The tube 233 is connected to the adapter 208 at its proximal end to connect to the external pressure unit 259. In the illustrated example, the collection tube 233 further includes an air channel (not shown). The air channel may extend along a length of the tube 233. The air channel includes a proximal opening that is to communicate with ambient air and a distal opening that is to communicate with the inside of a reservoir, for example near a bottom build material collection area in the reservoir. The air channel may facilitate readily collecting the build material from the bottom 209, for example aiding in venting near the bottom 209.

The air channel may be integral to the tube 233. In one example one or more air channels extends parallel to the vacuum channel in the tube 233, next to the vacuum channel of the tube 233. In another example, the air channel 253 extends concentric to the vacuum channel in the tube 233, i.e. around at least part of the vacuum channel, whereby the tube 233 includes two concentric tubular walls around a centre axis.

Inner walls of the outlet structure 234 can guide build material out of the container 114 to the pressure unit 259. For example, during vacuum suction of the build material, the build material flows out of the container 114 along the distal inlet openings 239, inner walls of the tube 233, and an opening 231 and cylindrical inner walls of the adapter 208. In one example the build material flows directly into the snout 273 of the pressure unit 259 from the tube 233, thereby not contacting the adapter 208 directly. These components of the container 114, along which the build material flows during a collection event, contain a conductive part for grounding. In one example, the parts, e.g., the distal end portion 237, tube 233 and/or adaptor 208, are formed of an at least partially conductive material. The at least partially conductive material can be a plastic compound including conductive particles or a metal. The metal can be aluminium or any allow containing aluminium and/or other metals. In other examples, a coating may be applied to said components along which the build material flows. In a further example, the outlet tube 233 is made conductive, whereby a ground connection is established between the tube 233 and external tube snout 273 during interconnection.

In a further example, the adapter 208 is at least partly made of said conductive material so that a charge as received from the tube 233 when build material flows through the tube 233 can be conducted by the adapter 208. The adapter 208 can discharge by connecting to the pressure unit snout 273. In a further example, connection to a ground connection of the pressure unit 259 can be further facilitated by further conductive components in the adapter 208 such as interconnect features 455.

Referring back to FIGS. 2A and 2B, a conductive discharge path may be provide through conductive elements of the connection unit 202, such as a pressure unit 259 of FIG. 5, to an earthed portion of the MMS 106. In some examples, the connection unit 202 may comprise an elongate conductor 204 which extends along the length of a tube body 212 of the connection unit 202 from the first to second end, and provides an electrostatic discharge path for the unit 202. However, in further examples, the conductor 204 may extend part way along the tube body 212. The elongate conductor may be a metallic wire, and may be at least partially encapsulated within the tube body 212. The conductor 204 may be at least partially, or substantially, encapsulated within a material of the tube body, so that the conductor 204 is insulated within the connection unit 202. The body of the unit 202 may be composed of a non-conductive material. Alternatively, the conductor 204 may be provided externally, for instance spiralling around the unit 202.

The first and second ends of the connection unit 202 comprise connections which are electrically connected to the conductor for electrically grounding the conductor 204. In an example, a connection wire is crimped at a first end of the tube 202 onto a connection of a conductor 204, although it will be appreciated that other connection techniques may be used. The connections between the conductor 204 and a connection wire may be covered with an electrically insulating covering.

In some examples, at least part of each of the fresh build material source container 114, the connection unit 202, and the adapter 208 are formed from a conductive material. Constructing each part from a conductive material may reduce cost and difficulty in manufacture. In further examples, the use of conductive material may be restricted to those parts where friction is likely to be generated due to contact with moving powder material may be formed from a conductive material, such as portions of the source container 114, the adapter 208, or the connection unit 202. In such examples, separate interconnectors (as shown in FIGS. 4 and 5) may not be used, as the conductive components such as the adaptor and connection unit are electrically coupled. However, the interconnectors may additionally be used to improve the connection, as detailed above. Alternatively, or additionally, the conductive material may comprise at least part, or a whole length, of the inside of a tube portion extending inwardly into the source container 114 from the adapter 208, such as illustrated by tube 233 in FIG. 3. In addition, at least a portion of tube body 212 of the collection unit 202 may be comprised from a conductive material. In these examples, the rest of the fresh build material source container 114 may be constructed from an alternative material. Such an alternative material may be selected on the basis of cost or relevant properties of the material.

In one example, the conductive material may be a conductive film which covers, or is adhered to, the adapter 208. Optionally, certain surfaces of the adapter 208 may be so covered, for instance those surfaces coming into contact with fast moving build material—principally the inside surfaces. The portion of the conductive material to cover such portions of the source container 114, as detailed above, may therefore be comprised of a conductive film. Such portions of conductive material may alternatively be considered a coating.

In one example, the conductive materials used for at least one of the parts may be a conductive plastic. A conductive plastic may be a plastic compound that includes conductive particles. Further examples may comprise the use of metals for at least one of these parts. Certain plastics may be lighter and cheaper than other conductive materials (for instance metals). Suitable conductive plastic materials include polycarbonate or polypropylene, or plastics with the addition of additives such as carbon, nickel, stainless steel, or graphite fillers. Alternatively, in some examples, the fillers used are carbon fibres, nanofibres or metal fibres. In general, a suitable material is one that is electrically conductive and which possess suitable mechanical properties for that particular part of the container. An example conductive material to form portions of an outlet structure comprise a moulded plastic component in which carbon or an alternative conductive additive is mixed into the plastic. The conductive material may be restricted to portions of the outlet structure facing the build material flow path, or may comprise or cover substantially the whole of the outlet structure. An example conductive material may comprise a material with a surface resistance of $1\times10^3$ to $1\times10^5$ $\Omega/m^2$. In further examples, a dissipative material with a surface resistance of $1\times10^5$ to $1\times10^9$ $\Omega/m^2$ may be used. In further examples, a suitable anti-static material, with a surface resistance of $1\times10^9$ to $1\times10^{12}$ $\Omega/m^2$ may be used.

In another example, the conductive material can be a metal. For example, the tube 233 can be at least partially made of aluminium, for example, extruded aluminium.

Figures 6A, 6B:
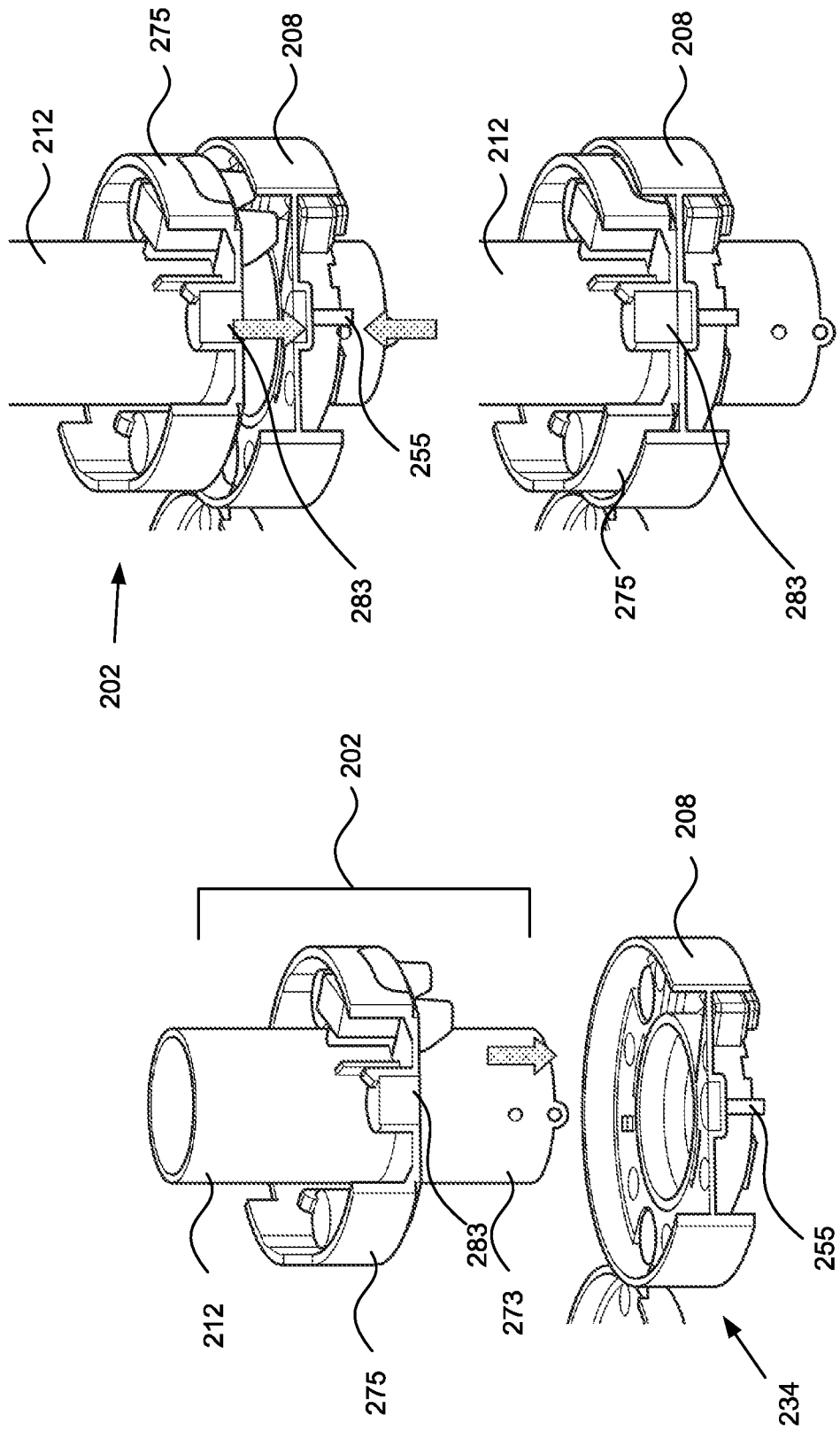
FIGS. 6A and 6B provide further views of a portion of an example build material source container.

FIGS. 6A-6B illustrate a more detailed example of a connection between a connection unit 202 to the MMS 106, such as a pressure unit 259 as illustrated in FIG. 6, to the outlet structure 234 of the fresh build material source container 114 in one example, and the formed electrical discharge path.

To connect the connection unit 202 to the outlet structure 234, a tube-shaped snout 273 of the connection unit 202 is inserted into the outlet adaptor 208 of the container unit 114, until the base of the connection unit adapter 275 is positioned adjacent the upper side of the outlet adapter 208 of the source container. This positioning enables the snout 273 to fit inside the tube 233, as detailed in FIG. 5, wherein in some examples, a friction fit may be established.

Each adapter 208, 275 may comprise a number of magnetic elements 255, 283, or other types of interconnectors, which serve to secure the connection unit adapter 275 to the adapter 208 of the source container 114. These interconnectors may be exposed in, or partly protrude from, annular interface faces of each adaptor 208, 275 around cylindrical powder flow channels in each adaptor. Such interconnectors 283 function to couple the adapter 208 to the tube magnetically, and to serve as an electrical connection. In an interconnected condition, the interconnectors provide a continuous conductive path between the conductive material portions of the source container 114, such as the provision of a conductive material comprised within at least part of the source container adapter 208 and outlet tube 233, wherein the path continues to an Earthed portion of the MMS 106. As the connective elements are brought within a certain distance, the magnetic force between brings the interconnecting parts 283 into contact and secures the connection as indicated by the arrows. This magnetic force secures the connection between the connection unit 202 and the build material container 114, and provides a safe and convenient connector insertion method for the user. In this example, the magnetic interconnectors provide for a grounding contact in addition to the retention force.

In some examples, the interconnector elements used may be metal fixing elements such as screws, or magnets, which are cheap and convenient to use. However, it will be appreciated that any suitable materials or elements may be used which provide a suitable magnetic and electrical connection. In additional examples, such connections may be provided through the data interface 287 as shown in FIG. 5. It will be appreciated that in such a case the data interface 287 will not be wholly insulated from conductive portions of the adapter or outlet structure. It will be further appreciated that in some cases a separate interconnector element may not be provided if at least part of the adapter is formed from a conductive material and up connection to the connection unit comes into electrical contact with a conductive portion of the connection unit.

A ground connection for the fresh build material source container 114 is therefore provided through the connection between the connection unit 202 and the outlet structure 234 of the source container 114. In an example, the conductivity path is formed from the conductive materials of at least the connection unit adaptor 275 and outlet adapter 208 of the source container, for example, through the at least one interconnecting element comprised within each of the adapters 208 and 275, an onwards to the conduction wire (as shown in FIGS. 2A and 2B) extending through the external tube 212 toward the MMS 106. However, it will be appreciated by the skilled person that many alternatives for electrically connecting the source container to the conduction wire or other conductive aspect of the tube may be used. In some examples the action of connecting the snout 273 of the connection unit 202 to the source container 214 for the purpose of supplying build material to the MMS 208 serves to form the electrical connection, without further actions to be attended to by the user. In some examples, the connection unit 202 and the outlet structure 234 serve to automatically align the electrical connection, for instance by the action of the magnets causing appropriate rotation of the snout 273. In some examples the conductive portions of the source container 214 are sufficiently extensive to ensure that an electrical connection will always be made upon coupling the internal and external tubes 217, 212 respectively. A continuous electrostatic discharge path is thus provided though the conductive material portion of the source container 114 to an Earthed portion of the MMS 106.

The adapter 275 of the connection unit 202 may be considered as a handle when magnetically secured in position to the container 114. A user may release the connection at any time by moving the handle in a direction away from the outlet structure 234 of the fresh build material source container 114. This provides an inexpensive, safe, robust and user-friendly method to ensure electrical grounding in the aspiration system of the supply.

In further examples, the MMS 106 of a 3D printer may comprise a build material source container, the source container having a wall defining a substantially enclosed space for holding build material and an aperture for build material ingress and egress, and a connection unit, a first end of the connection unit being connectable to the aperture of the source container to transport powdered material from the source container. At least part of the material source container may comprise a conductive material, and the connection unit comprises an electrically conductive portion to electrically connect the build material source container to an Earthed portion of the material management station. The connection unit may comprise a tube shaped body for transporting build material. The electrically conductive portion of the connection unit may comprise an elongate conductor at least partially encapsulated within a tube body.

In further examples, the MMS 206 may further comprise a first connection terminal located at a first end of the tube body, the first connection terminal being electrically connected to the conductor for grounding the tube, and a second connection terminal located at the second end of the tube, to provide an onward connection to Earth from the powdered material supply tank.

All of the features disclosed in this specification (including any accompanying claims, abstract and drawings) may be combined in any combination, except combinations where at least some of such features are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract and drawings) may be envisaged. The claims should not be construed to cover merely the foregoing examples, but also any variants which fall within the scope of the claims.

The invention claimed is:

1. A build material source container for use in a material management station of a three dimensional, 3D, printer, the source container comprising:
    an external reinforcement structure forming a substantially enclosed space for holding build material, the reinforcement structure being formed of an electrically non-conductive material and having a top and a bottom;
    an outlet structure having an aperture for build material ingress into and egress from the substantially enclosed space, wherein the outlet structure is connectable to a connection unit for extracting build material from the source container via air pressure, and wherein the outlet structure is located at the top of the reinforcement structure; and
    an internal tube extending into the substantially enclosed space from the aperture of the outlet structure to the bottom of the reinforcement structure, the internal tube including electrically conductive material that is in electrical communication with the outlet structure;
    wherein the outlet structure comprises an adapter to couple to a first end portion of the connection unit, the adapter further comprising a data interface to connect and provide transport data to a corresponding data interface on the connection unit; and
    wherein the adapter when connected to the connection unit forms part of a static electricity discharge path that includes the internal tube;
    wherein an interconnector further secures the adapter to the build material source container; or
    wherein the interconnector connects the adapter to the first end portion of the connection unit.

2. The build material source container of claim 1, wherein the adapter comprises at least one electrically conductive interconnector to electrically couple the outlet structure of the build material source container to an electrically conductive portion of the connection unit.

3. The build material source container of claim 1, wherein the outlet structure is to contact an electrically conductive portion of the connection unit to electrically couple the build material source container to Earth.

4. The build material source container of claim 1, wherein the adapter of the build material source container comprises at least one first conductive interconnector for connecting to a respective at least one second conductive interconnector arranged at an end portion of the connection unit.

5. The build material source container of claim 4, wherein at least one of the first and second conductive interconnectors is magnetic to magnetically couple to the other of the first and second conductive interconnectors to connect the adapter to the end portion of the connection unit.

6. The build material source container of claim 1, wherein the data interface is electrically isolated from the outlet structure.

7. The build material source container of claim 1, wherein at least a part of the electrically conductive material comprises a conductive plastic.

8. The build material source container of claim 1, wherein the electrically conductive material comprises a conductive plastic, a conductive film or coating, a wire or other circuitry applied to a component of the build material source container.

9. The build material source container of claim 8, wherein at least part of the electrically conductive material extends along at least a portion of the outlet structure that defines a build material outflow path of the container.

10. The build material source container of claim 9, wherein the internal tube is to collect build material from a portion of the container distal to the aperture.

11. The build material source container of claim 1, wherein the bottom of the reinforcement structure includes a funnel shape formed by included converging walls.

12. The build material source container of claim 11, wherein the internal tube comprises an end portion in contact with the funnel shaped bottom, the end portion including a suction opening through which build material is to enter into the internal tube from the external reinforcement structure.

13. The build material source container of claim 1, wherein the outlet structure is formed from an electrically conductive material and is connectable to Earth to discharge static electricity generated within the build material source container.

* * * * *